May 30, 1939. K. KRAMIS 2,160,219
PNEUMATIC TIRE
Filed Oct. 8, 1937

INVENTOR
KARL KRAMIS
By Young, Emery & Thompson
ATTORNEYS

Patented May 30, 1939

2,160,219

UNITED STATES PATENT OFFICE 2,160,219

PNEUMATIC TIRE

Karl Kramis, Zurich, Switzerland

Application October 8, 1937, Serial No. 168,061
In Switzerland April 29, 1937

13 Claims. (Cl. 152—197)

The present invention relates to a pneumatic tire with a protecting insertion such as employed for vehicles (automobiles, motor-bicycles, bicycles, tractors, mail-carts and the like) and for aircraft. The purpose of the protecting insertions is to subdivide the tire into a number of air chambers and to prevent it from becoming flat.

The protecting insertions hitherto known consist either of layers of fibrous or similar materials which are not capable of affording the desired protection, or else of layers of hard material formed from tapes, chains, woven metal, metal wool, slotted tapes or overlapping plates.

The protecting insertions consisting of rigid bands and the like have the result, however, that the pneumatic tire loses the requisite elasticity and flexibility. The protecting insertions with overlapping plates have the disadvantage that if these plates are sufficiently large and strong to arrest penetrating foreign bodies, the tires are rendered inelastic. In all cases however rubbing occurred at the edges of the plates, giving rise to heating and destruction of the cover.

The object of the present invention is to protect the air space of the tire without detrimentally affecting its elasticity, flexibility and extensibility or to cause detrimental heating and destruction of the tire by rubbing.

According to the invention the tire is provided with a protecting insertion which consists of harder and softer layers of material, the harder layers being built up from elements which constitute any desired geometrical bodies or combinations thereof other than plate-shaped or cubic bodies. These harder particles of material are arranged in offset relationship in the individual layers. As shown in the accompanying drawing, in which.

Figure 1:
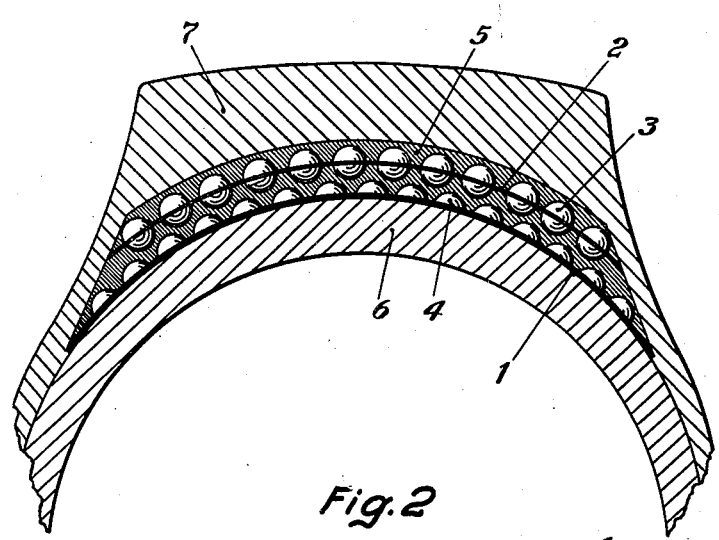
Fig. 1 shows a cross section through a pneumatic tire with one constructional form of the insertion by way of example.
Figure 2:
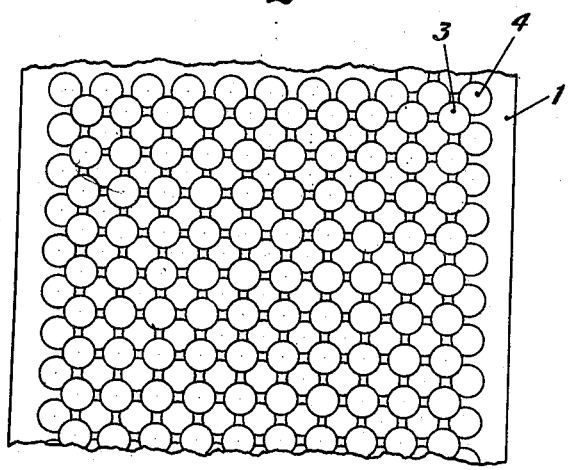
Fig. 2 shows a developed plan view of the insertion according to Fig. 1.

Mounted on the carcass 6 is a layer of soft fabric 1 which carries the harder elements 4, which in the embodiment shown are hemispherical. Mounted on a further layer of fabric 2 outside the layer 1 are further hemispherical elements 3, but, in contradistinction to the layer 1, these hemispherical elements are mounted on both sides of the layer of fabric 2 so as to form complete spheres. The arrangement is such that, as seen more clearly from Fig. 2, the elements 4 are offset with respect to the elements 3, so that any foreign body penetrating through the tread surface 7 is definitely deflected. The interstices between the elements are filled with a soft rubber mass 5 which is vulcanised to the elements 3 and 4 and to the fabric layers 1 and 2. The protecting insertion thus produced is then connected to the rubber of the tread 7.

In accordance with the stresses to which the tire is subjected, the harder elements may be chemical elements and compounds containing or free from carbon, or they may be metallic. It is an advantage if the harder material is capable of forming a good joint with the softer material either directly or with the aid of a binder. Thus the harder material may be hard rubber or vulcanite, or india rubber for example, which can very readily be united with soft rubber.

The protecting insertion may be incorporated in the cover and vulcanised therein or interposed between cover and inner tube as desired. It can also be employed in those tires in which the cover and tube consist of one piece. It is then preferably incorporated in the cover layer.

The individual layers may be subdivided longitudinally and transversely. The harder elements of material may for example be of egg-shaped, conical or of circular contour or may be represented by halves of such bodies and are so arranged that each ball or element of one layer of hard material lies between four balls or elements of the adjacent layer of hard material. Further the elements of harder material may be divided in half and connected together by means of a softer layer of material, e. g., rubberised fabric, which extends parallel to the outside of the tire and passes through the balls or elements. Equally the harder elements, e. g., conical elements which have a flat surface, could be connected to such layers of softer material at this flat surface.

By building up the layers of harder material from individual elements the elasticity, flexibility and extensibility of the tire are unimpaired. As the elements according to the invention normally have an outwardly curved convex surface, they deflect penetrating foreign bodies out of the direct direction of entry so that the pressure of the foreign body, e. g., a nail, on the protecting layer is reduced, is located outside the cover, is converted into a bending pressure on the foreign body itself and the foreign body as such is thereby bent outside the cover.

If, however, a foreign body nevertheless penetrates between the elements of the outermost layer of hard material, then it encounters a curved convex element of the next hard layer by which it is stopped and deflected. The deflection from the direction of entry and the repeated deflection at elements with convex outer surfaces at the next layer of hard material safely protects the inner tube or carcass of the tire against penetrating nails and other foreign bodies.

Due to the simple or multiple curved convex surfaces of the elements, rubbing at sharp edges is avoided so that the hard layers do not cause any heating and destruction of the protecting layer itself or of the tire.

As penetrating foreign bodies are less arrested than deflected from the vertical direction by the elements of the layers of harder material, the pressure acting on the foreign body is located outside the cover. Consequently the layers of harder material need only be of moderate hardness, e. g., as hard as leather. The smaller the difference in hardness between the harder and softer material, the smaller is the friction and the stresses which arise.

It will be apparent that many other modifications fall within the scope of the present invention. Thus for example the layers of harder and softer material may consist of natural and synthetic rubber or compounds thereof. Also the solid bodies forming the elements of the harder layers could be constituted by double cones bisected axially and placed with the curved surfaces facing towards the tread of the tire. These modifications are mentioned by way of example and are in no way restrictive or limitative of the invention beyond the definition contained in the appended claims.

I claim:

1. A pneumatic tire assembly comprising an air chamber and, interposed between said air chamber and the tread of the tire, a protecting layer including layers of harder and softer material, the layers of harder material consisting of spaced geometrical bodies which present a convex surface towards the outside of the tire and combinations of such bodies, and the bodies in the layers of harder material being arranged in offset relationship in the adjacent layers and serving to laterally deflect any sharp objects penetrating said tire.

2. In a pneumatic tire assembly comprising an outer cover and an inner tube, a protecting layer embedded and vulcanised in the outer cover, the protecting layer including layers of harder and softer material, the layers of harder material consisting of spaced geometrical bodies which present a convex surface towards the outside of the tire and combinations of such bodies, and the bodies in the layers of harder material being arranged in offset relationship in the adjacent layers and serving to laterally deflect any sharp objects penetrating said tire.

3. In a pneumatic tire assembly comprising an outer cover, an inner tube and a protecting layer interposed between said tube and cover, a protecting layer including layers of harder and softer material, the layers of harder material consisting of spaced geometrical bodies which present a convex surface towards the outside of the tire and combinations of such bodies, and the bodies in the layers of harder material being arranged in offset relationship in the adjacent layers and serving to laterally deflect any sharp objects penetrating said tire.

4. In a pneumatic tire assembly comprising an inflatable tube and a cover integral therewith, the incorporation in the cover of a protecting layer including layers of harder and softer material, the layers of harder material consisting of spaced geometrical bodies which present a convex surface towards the outside of the tire and combinations of such bodies, and the bodies in the layers of harder material being arranged in offset relationship in the adjacent layers and serving to laterally deflect any sharp objects penetrating said tire.

5. A pneumatic tire assembly comprising an air chamber and, interposed between said air chamber and the tread of the tire, a protecting layer including layers of spaced geometrical bodies of hard rubber which present a convex surface towards the outside of the tire and combinations of such geometrical bodies and layers of softer material, the said hard rubber bodies being arranged in offset relationship in the adjacent layers and serving to laterally deflect any sharp objects penetrating said tire.

6. A pneumatic tire assembly comprising an air chamber and, interposed between said air chamber and the tread of the tire, a protecting layer including layers of spaced geometrical bodies of metal which present a convex surface towards the outside of the tire and combinations of such geometrical bodies and layers of softer material, the said metal bodies being arranged in offset relationship in the adjacent layers and serving to laterally deflect any sharp objects penetrating said tire.

7. A pneumatic tire assembly including between the air chamber and the tread surface a protecting unit comprising a layer of fabric, a series of bodies of hard material with convex curved surfaces on one side and substantially flat surfaces on the other side and attached to said layer of fabric at said flat surfaces, a layer of soft material of thickness appreciably greater than that of said bodies mounted on said layer of fabric on the same side as said bodies, and—embedded in said soft material—a further series of bodies of hard material with convex curved surfaces at least on the side facing away from the first series of bodies and arranged to be in offset relationship to said first series.

8. A pneumatic tire assembly according to claim 7 comprising also a further strip of fabric embedded in the soft material and attached to the further series of bodies.

9. A pneumatic tire assembly including between the air chamber and the tread surface a protecting unit comprising a strip of fabric, a series of hemispherical bodies attached thereto at their plane surfaces, a block of soft rubber vulcanized to said fabric, and—embedded in said block—a series of spherical bodies lying in a plane substantially parallel to said fabric and located above the interstices between said hemispherical bodies.

10. A pneumatic tire assembly according to claim 9 including also a second strip of fabric extending in a plane substantially parallel to the first mentioned fabric strip and passing through the spherical bodies which are each constituted by two hemispherical bodies secured at their plane surfaces to opposite sides of said second strip.

11. A protective strip for pneumatic tires, comprising a plurality of spaced layers of hard elements, the elements of each layer being spaced apart, and layers of soft penetrable material positioned between the layers of hard elements and in the spaces between the hard elements of each layer of the latter, the elements of one layer being in register with the spaces between the elements of an adjacent layer and each element having a convex surface facing the outer surface of said strip for laterally deflecting any sharp objects penetrating the outer surface of said strip.

12. A protective strip for pneumatic tires, comprising a soft penetrable material, and a plurality of spaced layers of impenetrable elements embedded in said soft material, the elements of each layer being spaced and the elements of one layer being in register with the spaces between the elements of an adjacent layer, and each element having a convex surface facing the outer surface of said strip for laterally deflecting any sharp objects penetrating the outer surface of said strip.

13. A protective strip for pneumatic tires, comprising a soft penetrable material, a plurality of spaced layers of impenetrable elements embedded in said soft material, the elements of each layer being spaced and the elements of one layer being in register with the spaces between the elements of an adjacent layer, and each element having a convex surface facing the outer surface of said strip for laterally deflecting any sharp objects penetrating the outer surface of said strip, and fabric strips carrying the embedded impenetrable elements.

KARL KRAMIS.